United States Patent
Wu

(10) Patent No.: US 10,567,265 B2
(45) Date of Patent: Feb. 18, 2020

(54) SOLUTION TEST METHOD AND SERVER

(71) Applicant: WUHAN DOUYU NETWORK TECHNOLOGY CO., LTD., Wuhan (CN)

(72) Inventor: Ruicheng Wu, Wuhan (CN)

(73) Assignee: WUHAN DOUYU NETWORK TECHNOLOGY CO., LTD., Wuhan (CN)

( * ) Notice: Subject to any disclaimer, the term of this patent is extended or adjusted under 35 U.S.C. 154(b) by 151 days.

(21) Appl. No.: 15/750,366

(22) PCT Filed: Mar. 6, 2017

(86) PCT No.: PCT/CN2017/075730
§ 371 (c)(1),
(2) Date: Feb. 5, 2018

(87) PCT Pub. No.: WO2018/103214
PCT Pub. Date: Jun. 14, 2018

(65) Prior Publication Data
US 2019/0014028 A1    Jan. 10, 2019

(30) Foreign Application Priority Data
Dec. 7, 2016    (CN) .......................... 2016 1 1116006

(51) Int. Cl.
*H04L 12/26*    (2006.01)
*H04L 29/12*    (2006.01)
*H04L 29/08*    (2006.01)

(52) U.S. Cl.
CPC .......... *H04L 43/50* (2013.01); *H04L 61/2007* (2013.01); *H04L 67/32* (2013.01); *H04L 61/609* (2013.01); *H04L 61/6068* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2011/0212770 A1* | 9/2011 | Ocko | A63F 13/12 463/29 |
| 2016/0085658 A1* | 3/2016 | Manion | G06F 8/65 717/124 |
| 2017/0090904 A1* | 3/2017 | Shida | G06F 11/0709 |
| 2018/0097974 A1* | 4/2018 | Zweig | G11B 27/031 |
| 2018/0150758 A1* | 5/2018 | Niininen | H04L 41/16 |

* cited by examiner

Primary Examiner — Rebecca E Song
(74) Attorney, Agent, or Firm — Platinum Intellectual Property LLP

(57) ABSTRACT

The embodiments of the present invention disclose a solution test method and a server, applied to the field of computer technology. The method includes: obtaining a pre-generated description file of an IP distribution strategy for an AB test; reading the description file of the IP distribution strategy after determining that the description file of the IP distribution strategy satisfies a preset reading condition; assembling the contents of the description file of the IP distribution strategy into an internal structural body, and sending an access request to a preset access adding strategy interface; and updating the IP distribution strategy. With the embodiments of the present invention, the IP distribution strategy may become effective in real time, and thus the precision of the AB test is improved.

8 Claims, 3 Drawing Sheets

SOLUTION TEST METHOD AND SERVER

FIELD OF THE INVENTION

The present invention relates to the field of computer technology, and in particular to a solution test method and a server.

BACKGROUND OF THE INVENTION

The so-called AB test is to develop two solutions (for example, two pages) for the same objective, so that a part of users uses the solution A, the other part of users uses the solution B, the use conditions of the users are recorded to determine which solution better satisfies the design objective.

In a live video website, in order to improve the user experience during live video watching, the website frequently adjusts products and systems through various methods and strategies, at this time, user feedback needs to be quickly obtained so that the effects of the new solution can be adjusted in time, and the solution is iteratively updated according to the feedback data of the users, and if the feedback results of the users on the solutions of the products and the systems are unsatisfactory, the current new solution even needs to be abandoned, so the AB test is very important in a live video system and is the core foundation of data-driven products.

In a general AB test process, two solutions are operated at the same time in parallel: Control (reference solution) and Treatment (experimental solution), the shorter the effective process of the experimental solution is, the more accurate the test of feedback of a group of users on the trial of the new solution. In the effective process of the experimental solution, the inflow and outflow of users in the website are completely unpredictable, and thus the effective time of the experimental solution needs to be shortened in the test. Moreover, for the live video website, the new solution is adjusted frequently and the AB test frequency is high, so the friendliness of using an AB test system is quite important, such that more non-technical persons may participate in the AB test process, and the error probability of the AB test strategy may be reduced.

In the live video website, the HTTP request of the user firstly enters a website gateway server, and then the gateway server allocates the HTTP request to a specific background service server for processing according to the IP range (users in a specific region) characteristics of the request. How to configure the IP strategy in the gateway server is especially important. In the existing AB test method, if an IP distribution strategy needs to be modified, a company business team specifies the geographical range of the users to limit that only the users in some regions can use new functions, and after the request is submitted to a technical team, the technical team outputs a configuration file content to an operation and maintenance team for operation, and the gateway server needs to be restarted, so that the gateway server becomes effective to the newly entering HTTP request, and if the newly configured IP range is hit, the HTTP request is distributed to the background server corresponding to the new solution for processing. Too many people are involved in the whole process, so that the distribution strategy is prone to errors, and the effective process is long.

SUMMARY OF THE INVENTION

The embodiments of the present invention provide a solution test method and a server. An IP distribution strategy is dynamically configured and is directly updated in the memory of the server, so that the IP distribution strategy may become effective in real time, and thus the precision of the AB test is improved.

In a first aspect, the present application provides a solution test method, applied to a server, the method including:

obtaining a pre-generated description file of an IP distribution strategy for an AB test;

reading the description file of the IP distribution strategy after determining that the description file of the IP distribution strategy satisfies a preset reading condition;

assembling the contents of the description file of the IP distribution strategy into an internal structural body, and sending an access request to a preset access adding strategy interface, wherein the access request includes the internal structural body; and when the access strategy interface receives the access request, updating the IP distribution strategy in the memory of the server by using the internal structural body so as to perform the AB test of IP distribution.

Preferably, before the step of obtaining a pre-generated description file of an IP distribution strategy for an AB test, the method further includes:

generating the description file of the IP distribution strategy for the AB test.

Preferably, the step of generating the description file of the IP distribution strategy for the AB test includes:

patterning a user map to obtain a geographical range of the AB test selected by an operating person;

obtaining an IP segment address range corresponding to the geographical range according to the geographical range; and generating the description file of the IP distribution strategy for the AB test according to the IP segment address range.

Preferably, if the generation time of the description file of the IP distribution strategy is greater than the previous reading time of the description file of the IP distribution strategy, it is determined that the description file of the IP distribution strategy satisfies the preset reading condition.

Preferably, the description file of the IP distribution strategy is a configuration file in a json format;

the step of assembling the contents of the description file of the IP distribution strategy into an internal structural body includes:

reading the configuration file in the json format; and assigning different fields in the configuration file in the json format to preset various object attributes of the internal structural body.

Preferably, the method further includes:

collecting user behavior features or use experience feedback of a user on an experimental function; and adjusting the IP distribution strategy according to the user behavior features or the use experience feedback to generate a new description file of the IP distribution strategy for the AB test, and updating the new description file into the memory of the server.

In a second aspect, the present application provides a server, including:

an obtaining unit for obtaining a pre-generated description file of an IP distribution strategy for an AB test;

a reading unit for reading the description file of the IP distribution strategy after determining that the description file of the IP distribution strategy satisfies a preset reading condition;

an assembly unit for assembling the contents of the description file of the IP distribution strategy into an internal structural body, and sending an access request to a preset access adding strategy interface, wherein the access request includes the internal structural body; and an updating unit for, when the access strategy interface receives the access request, updating the IP distribution strategy in the memory of the server by using the internal structural body so as to perform the AB test of IP distribution.

Preferably, the server further includes:

a generation unit for, before the step of obtaining a pre-generated description file of an IP distribution strategy for an AB test, generating the description file of the IP distribution strategy for the AB test.

Preferably, the generation unit is specifically used for:

patterning a user map to obtain a geographical range of the AB test selected by an operating person;

obtaining an IP segment address range corresponding to the geographical range according to the geographical range; and generating the description file of the IP distribution strategy for the AB test according to the IP segment address range.

Preferably, if the generation time of the description file of the IP distribution strategy is greater than the previous reading time of the description file of the IP distribution strategy, it is determined that the description file of the IP distribution strategy satisfies the preset reading condition.

Preferably, the description file of the IP distribution strategy is a configuration file in a json format;

the assembly unit is specifically used for:

reading the configuration file in the json format; and assigning different fields in the configuration file in the json format to preset various object attributes of the internal structural body.

Preferably, the server further includes:

a user feedback unit for collecting user behavior features or use experience feedback of a user on an experimental function; and the updating unit is further used for adjusting the IP distribution strategy according to the user behavior features or the user to generate a new description file of the IP distribution strategy for the AB test, and updating the new description file into the memory of the server.

It can be seen from the above technical solutions that the embodiments of the present invention have the following advantages:

In the embodiments of the present invention, the following operations are executed: obtaining the pre-generated description file of the IP distribution strategy for the AB test; reading the description file of the IP distribution strategy after determining that the description file of the IP distribution strategy satisfies the preset reading condition; assembling the contents of the description file of the IP distribution strategy into the internal structural body, and sending the access request to the preset access adding strategy interface; and when the access strategy interface receives the access request, updating the IP distribution strategy in the memory of the server by using the internal structural body so as to perform the AB test of IP distribution. In the embodiments of the present invention, the IP distribution strategy is dynamically configured and is directly updated in the memory of the server, and therefore the IP distribution strategy may become effective in real time, and the precision of the AB test is improved.

BRIEF DESCRIPTION OF THE DRAWINGS

Various other advantages and benefits will become apparent to those of ordinary skill in the art upon reading the following detailed description of the preferred embodiments. The drawings are only for the purpose of illustrating the preferred embodiments and are not construed as limiting the present invention. Moreover, throughout the drawings, the same reference signs are used for expressing the same components. In the drawings.

DETAILED DESCRIPTION OF THE EMBODIMENTS

In order that those skilled in the art can better understand the solutions of the present invention, a clear and complete description of technical solutions in the embodiments of the present invention will be given below in combination with the accompanying drawings in the embodiments of the present invention. Apparently, the embodiments described are merely a part, but not all, of the embodiments of the present invention. All of other embodiments, obtained by those of ordinary skill in the art based on the embodiments of the present invention without any creative effort shall be encompassed within the protection scope of the present invention.

The terms "first", "second" and the like (if any) in the description, claims and the above-mentioned drawings of the present invention are used for distinguishing similar objects only and are not used for describing a particular order or sequence. It should be understood that the data used herein may be interchangeble as appropriate, so that the embodiments described herein may be implemented in an order other than what is illustrated or described herein. Furthermore, the terms "include" and "have" and any variations thereof are intended to cover non-exclusive inclusion, for example, processes, methods, systems, products or devices containing a series of steps or units are not necessarily limited to those expressly listed steps or units, but may include other steps or units that are not expressly listed or are inherent to these processes, methods, products or devices.

Figure 1:
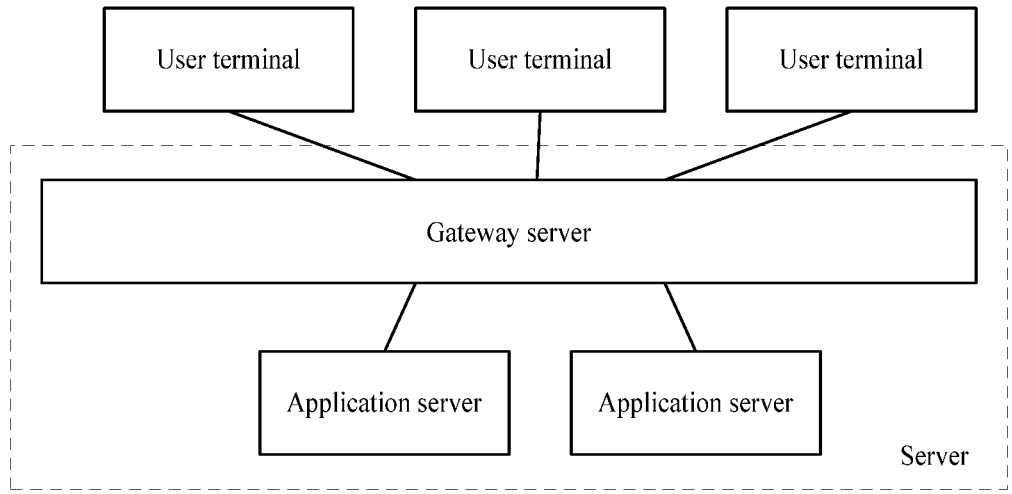
FIG. 1 is a schematic diagram of one embodiment of a solution test method in an embodiment of the present invention.

As shown in FIG. 1, which is a schematic diagram of hardware architecture of a solution test implementation scenario in an embodiment of the present invention, the solution test method in the embodiment of the present invention is applied to a gateway server in FIG. 1, a server in the embodiment of the present invention may include the gateway server and an application server, the gateway server and the application server may be one hardware main body and may also be separate hardware main bodies. The gateway server is respectively in networked connection with the application server and a user terminal.

Figure 2:
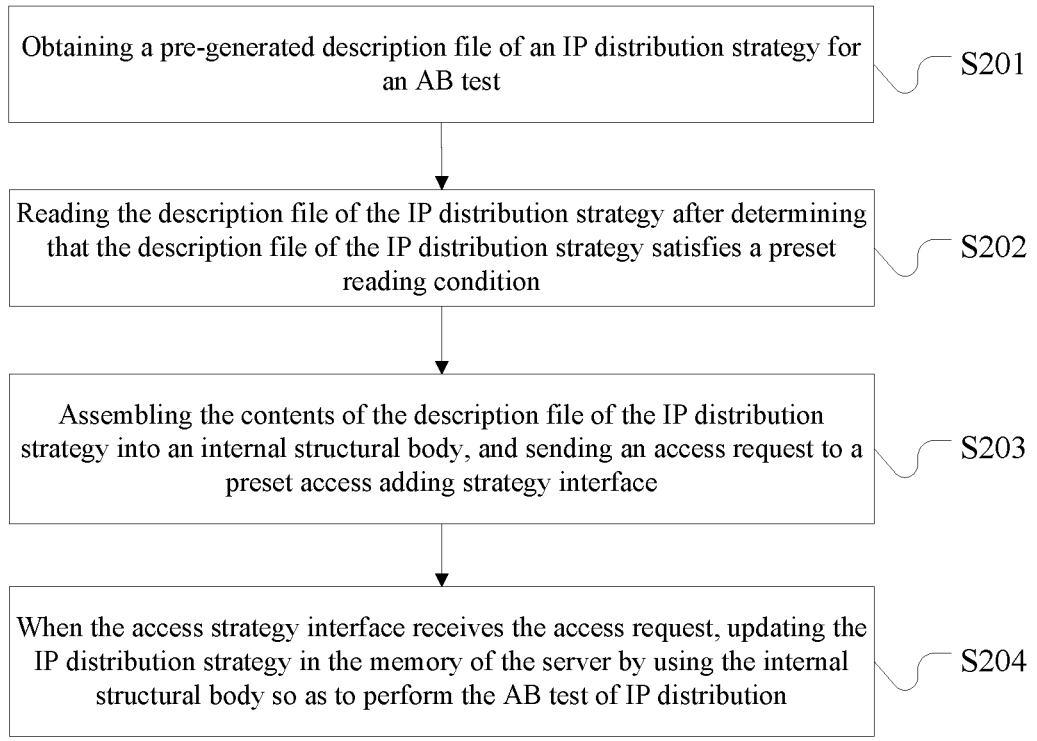
FIG. 2 is a schematic diagram of another embodiment of a solution test method in an embodiment of the present invention.

Referring to FIG. 2, one embodiment of the solution test method in the embodiment of the present invention includes:

S201, obtaining a pre-generated description file of an IP distribution strategy for an AB test;

S202, reading the description file of the IP distribution strategy after determining that the description file of the IP distribution strategy satisfies a preset reading condition;

S203 assembling the contents of the description file of the IP distribution strategy into an internal structural body, and sending an access request to a preset access adding strategy interface;

wherein the access request includes the internal structural body; and sending the access request to the preset access adding strategy interface may be specifically as follows: the gateway server in FIG. 1 may expose service through an HTTP interface and send a POST request to the preset access adding strategy interface (the HTTP interface), wherein the POST request contains the internal structural body of the distribution strategy that is generated in the precious step.

S204, when the access strategy interface receives the access request, updating the IP distribution strategy in the memory of the server by using the internal structural body so as to perform the AB test of IP distribution.

In the embodiment of the present invention, the following operations are executed: obtaining the pre-generated description file of the IP distribution strategy for the AB test; reading the description file of the IP distribution strategy after determining that the description file of the IP distribution strategy satisfies the preset reading condition; assembling the contents of the description file of the IP distribution strategy into the internal structural body, and sending the access request to the preset access adding strategy interface; and when the access strategy interface receives the access request, updating the IP distribution strategy in the memory of the server by using the internal structural body so as to perform the AB test of IP distribution. In the embodiment of the present invention, the IP distribution strategy is dynamically configured and is directly updated in the memory of the server, and therefore the IP distribution strategy may become effective in real time, and the precision of the AB test is improved.

Figure 3:
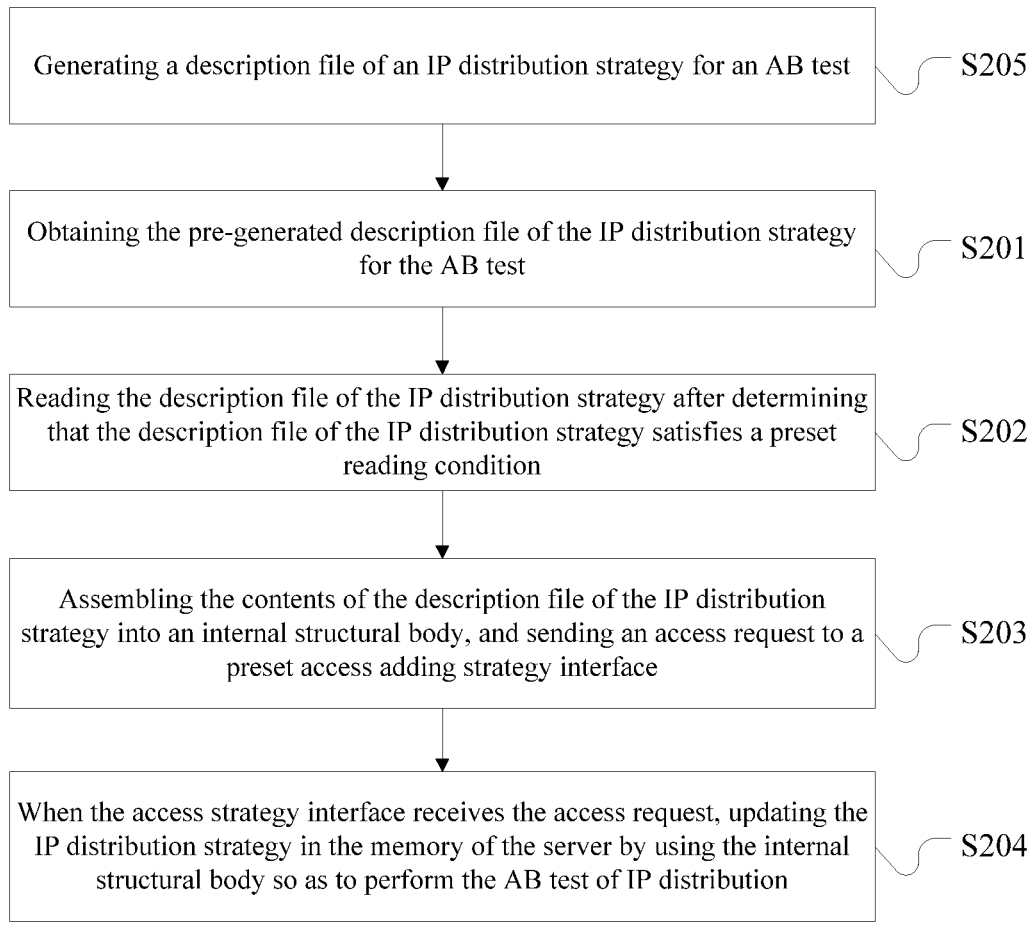
FIG. 3 is a schematic diagram of another embodiment of a solution test method in an embodiment of the present invention.

Preferably, as shown in FIG. 3, before the step of obtaining a pre-generated description file of an IP distribution strategy for an AB test, the method further includes:

S205, generating the description file of the IP distribution strategy for the AB test.

Figure 4:
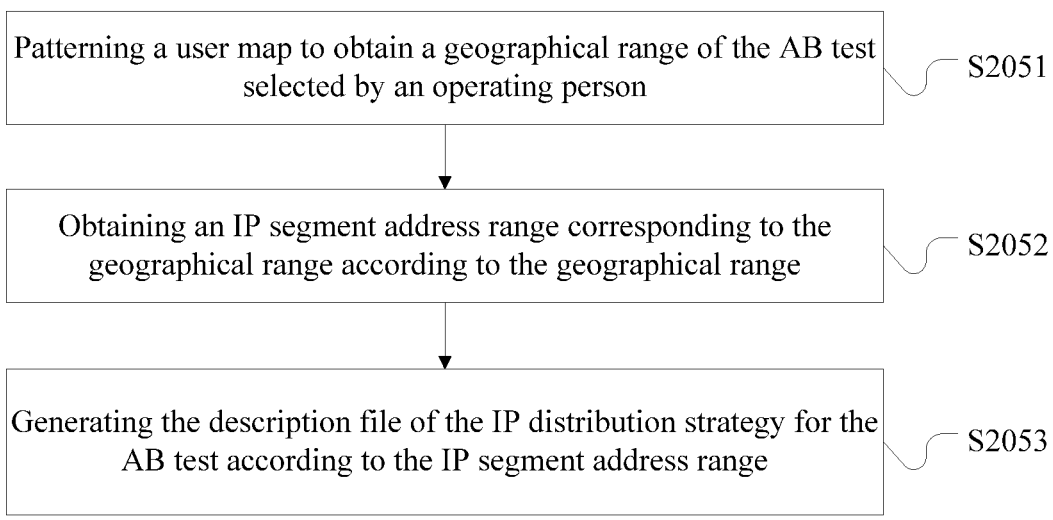
FIG. 4 is a specific schematic diagram of a step of a solution test method in an embodiment of the present invention.

Preferably, as shown in FIG. 4, the step S205 specifically includes:

S2051, patterning a user map to obtain a geographical range of the AB test selected by an operating person;

for example, in view of the effectiveness of a user test experimental solution in a specific region, a product team will firstly determine the geographical range of the solution according to the user features of a website. For example, a valuable gift needs to be newly added in a webcast room, the rationality of the amount setting needs to be verified, Shanghai Telecom users with high payment ability may be selected for preferential trial according to a historical payment model, in this way, the new valuable gift is only visible to the Shanghai users, the use feedback conditions of the Shanghai users on the new valuable gift within a week are observed, and whether further adjustment is required is judged appropriately.

In the embodiment of the present invention, the geographical range corresponding to the AB test may be selected according to preset user map distribution of users in the server.

S2052, obtaining an IP segment address range corresponding to the geographical range according to the geographical range;

for example, after three geographical ranges, Beijing, Hangzhou and Shanghai are selected, the IP segment address ranges corresponding to the Beijing, Hangzhou and Shanghai are obtained, and the IP segment corresponding to each geographical range may be preset in the server and is directly inquired after the geographical range is determined.

S2053, generating the description file of the IP distribution strategy for the AB test according to the IP segment address range.

Preferably, if the generation time of the description file of the IP distribution strategy is greater than the previous reading time of the description file of the IP distribution strategy, it is determined that the description file of the IP distribution strategy satisfies the preset reading condition.

In the embodiment of the present invention, as the geographical range of the AB test selected by the operating person is obtained by operating, via a Web UI (patterning operation), a user map, to generate the description file of the IP distribution strategy for the AB test, the process may be completely operated by non-technical colleague who proposes the adjustment of the IP distribution strategy, and thus the probability of travel is greatly reduced.

Preferably, the description file of the IP distribution strategy is a configuration file in a json format;

the step of assembling the contents of the description file of the IP distribution strategy into an internal structural body includes:

reading the configuration file in the json format; and assigning different fields in the configuration file in the json format to preset various object attributes of the internal structural body.

The data format of a specific IP distribution strategy of the configuration file in the json format is as follows:

```
{ "prop": "device.city",
"val": "Hangzhou, Beijing, and Shanghai",
"iplist": [
    {
"ip": ***.***.***.***       // IP segment address range of
                                Hangzhou Telecommunication
    },
    {
"ip": ***.***.***.***       // long and wide IP segment
address range of Beijing Great Wall Broadband
    },
    {
"ip": ***.***.***.***       // IP segment address range
                                of Shanghai Telecommunication
}
}
```

Further, a plurality of IP distribution strategies may be stored in the server, and each IP distribution strategy corresponds to a priority, the priority level may be defined according to a number or a letter, for example, the priority of the IP distribution strategy of level 1 is highest starting from 1, and a specific example is shown as follows:

```
{
    "1":{
    "divtype":"ip_range",
    "divdata":[
    {IP rule 1},
    {IP rule 2},
    ...
```

```
        ]
      },
      "2":{
      },
      ...
    }
```

In the above example, the priority of the IP distribution strategy with the priority number 1 is the highest.

After the gateway server updates the IP distribution strategy, it tries to match the IP distribution strategy in the memory according to the IP address to which the newly entering user HTTP request belongs. If the current IP distribution strategy is matched, the HTTP request is submitted to the application server corresponding to the experimental solution. The request distribution of the present AB test is thus completed.

In the embodiment of the present invention, the user who hits an IP shunting strategy may use a new website function that causes the experimental solution to take effect, and the user experience of the experimental function may be collected through user behavior features or a feedback function, the business team may adjust the strategy of the experimental solution in time according to the collected user feedback to realize iterative optimization and continuously improve the user experience.

Thus, preferably, the method further includes:

collecting user behavior features or use experience feedback of a user on an experimental function; and adjusting the IP distribution strategy according to the user behavior features or the use experience feedback to generate a new description file of the IP distribution strategy for the AB test, and updating the new description file into the memory of the server.

The embodiment of the server in the embodiment of the present invention will be introduced below, and the server in the embodiment of the present invention is the gateway server in FIG. 1.

Figure 5:
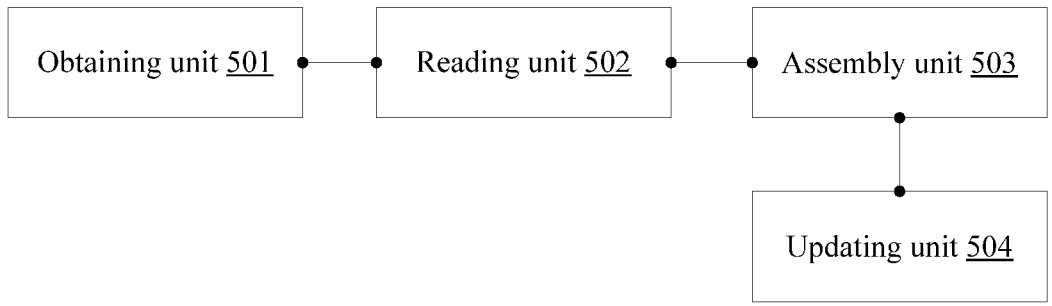
FIG. 5 is a schematic diagram of one embodiment of a server in an embodiment of the present invention.

Referring to FIG. 5, which is an embodiment of the server in the embodiment of the present invention, the server includes:

an obtaining unit 501 for obtaining a pre-generated description file of an IP distribution strategy for an AB test;

a reading unit 502 for reading the description file of the IP distribution strategy after determining that the description file of the IP distribution strategy satisfies a preset reading condition;

an assembly unit 503 for assembling the contents of the description file of the IP distribution strategy into an internal structural body, and sending an access request to a preset access adding strategy interface, wherein the access request includes the internal structural body; and an updating unit 504 for, when the access strategy interface receives the access request, updating the IP distribution strategy in the memory of the server by using the internal structural body so as to perform the AB test of IP distribution.

Figure 6:
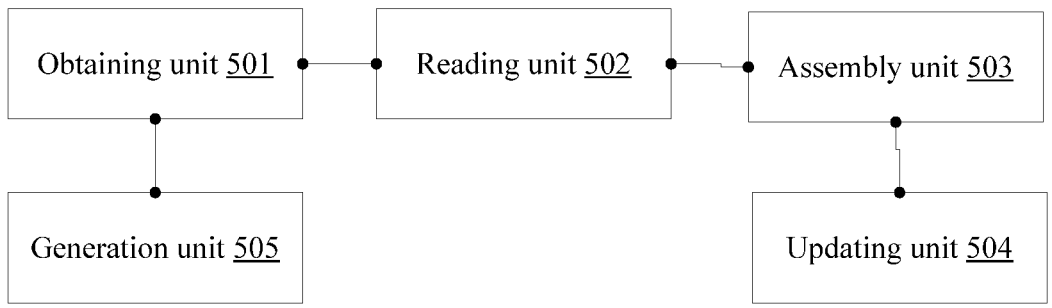
FIG. 6 is a schematic diagram of another embodiment of a server in an embodiment of the present invention.

Preferably, as shown in FIG. 6, the server further includes:

a generation unit 505 for, before the step of obtaining a pre-generated description file of an IP distribution strategy for an AB test, generating the description file of the IP distribution strategy for the AB test.

Preferably, the generation unit 505 is specifically used for:

patterning a user map to obtain a geographical range of the AB test selected by an operating person;

obtaining an IP segment address range corresponding to the geographical range according to the geographical range; and generating the description file of the IP distribution strategy for the AB test according to the IP segment address range.

Preferably, if the generation time of the description file of the IP distribution strategy is greater than the previous reading time of the description file of the IP distribution strategy, it is determined that the description file of the IP distribution strategy satisfies the preset reading condition.

Preferably, the description file of the IP distribution strategy is a configuration file in a json format;

the assembly unit 503 is specifically used for:

reading the configuration file in the json format; and assigning different fields in the configuration file in the json format to preset various object attributes of the internal structural body.

Figure 7:
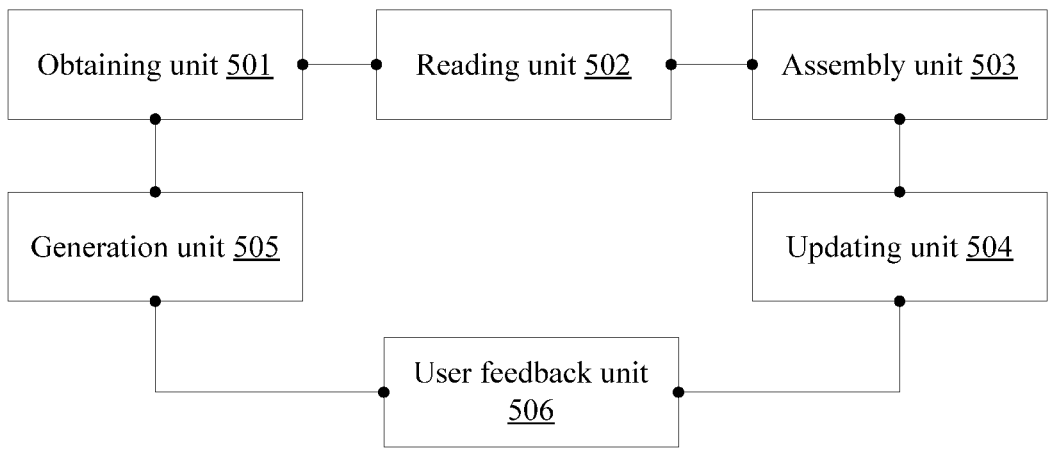
FIG. 7 is a schematic diagram of another embodiment of a server in an embodiment of the present invention.

Preferably, as shown in FIG. 7, the server further includes:

a user feedback unit 506 for collecting user behavior features or use experience feedback of a user on an experimental function; and the updating unit is further used for adjusting the IP distribution strategy according to the user behavior features or the user to generate a new description file of the IP distribution strategy for the AB test, and updating the new description file into the memory of the server.

Those skilled in the art may clearly understand that, for convenience and simplicity of description, the specific working processes of the system, the apparatus and the units described above may be got by referring to corresponding processes in the foregoing method embodiments, which will not be repeated herein.

In the several embodiments provided in the present application, it should be understood that the disclosed system, apparatus and method may be implemented in other manners. For example, the apparatus embodiments described above are merely illustrative, e.g., the division of the units is only a logic function division, other division manners may exist in practical implementation, for example, a plurality of units or components may be combined or integrated to another system, or some features may be omitted or not implemented. From another point of view, the shown or discussed mutual coupling or direct coupling or communication connection may be indirect coupling or communication connection of apparatuses or units through some interfaces, and may be in electrical, mechanical or other forms.

The units described as separate components may be or may be not separated physically, components shown as units may be or may be not physical units, namely, may be located in one place, or may also be distributed on a plurality of network units. A part of or all of the units may be selected according to actual need to achieve the objective of the technical solutions in the embodiments.

In addition, the functional units in the embodiments of the present invention may be integrated in one processing unit, or the units separately exist physically, or two or more units are integrated in one unit. The integrated unit may be implemented in a hardware form and may also be implemented in the form of a software functional unit.

If the integrated unit is implemented in the form of the software functional unit and is sold or used as an independent product, it may be stored in a computer readable storage medium. Based on this understanding, the technical solutions of the present invention substantially, or the part contributing to the prior art, or all or a part of the technical solutions may be implemented in the form of a software product, the computer software product is stored in a storage medium, and includes a plurality of instructions causing a computer device (which may be a personnel computer, a server, or a network device or the like) to execute all or a part of the steps of the methods in the embodiments of the present invention. The foregoing storage medium includes a variety of media capable of storing program codes, such as a USB disk, a mobile hard disk, a read-only memory (ROM), a random access memory (RAM), a magnetic disk, an optical disk or the like.

In the above description, the foregoing embodiments are merely used for illustrating the technical solutions of the present invention, rather than limiting the them; although the present invention has been described in detail with reference to the foregoing embodiments, those of ordinary skill in the art should understand that they could still make modifications to the technical solutions recorded in the foregoing embodiments or make equivalent substitutions to a part of technical features therein; and these modifications or substitutions do not make the essence of the corresponding technical solutions depart from the spirit and scope of the technical solutions of the embodiments of the present invention.

The invention claimed is:

1. A solution test method, applied to a server, the method comprising:
   obtaining a pre-generated description file of an IP distribution strategy for an AB test;
   reading the description file of the IP distribution strategy after determining that the description file of the IP distribution strategy satisfies a preset reading condition;
   assembling the contents of the description file of the IP distribution strategy into an internal structural body, and sending an access request to a preset access adding strategy interface, wherein the access request includes the internal structural body; and
   when the access adding strategy interface receives the access request, updating the IP distribution strategy in a memory of the server by using the internal structural body so as to perform the AB test of IP distribution;
   and wherein the description file of the IP distribution strategy is a configuration file in a json format;
   and wherein the assembling the contents of the description file of the IP distribution strategy into an internal structural body comprises:
      reading the configuration file in the json format; and
      assigning different fields in the configuration file in the json format to preset various object attributes of the internal structural body.

2. The method of claim 1, wherein before the step of obtaining a pre-generated description file of an IP distribution strategy for an AB test, the method further comprises:
   generating the description file of the IP distribution strategy for the AB test.

3. The method of claim 2, wherein the step of generating the description file of the IP distribution strategy for the AB test comprises:
   patterning a user map to obtain a geographical range of the AB test selected by an operating person;
   obtaining an IP segment address range corresponding to the geographical range according to the geographical range; and
   generating the description file of the IP distribution strategy for the AB test according to the IP segment address range.

4. The method of claim 1, wherein if a generation time of the description file of the IP distribution strategy is greater than a previous reading time of the description file of the IP distribution strategy, determining that the description file of the IP distribution strategy satisfies the preset reading condition.

5. A server, comprising a processor and a memory stored with program codes, and wherein the program codes, when executed by the processor, cause the processor to implement the following steps:
   obtaining a pre-generated description file of an IP distribution strategy for an AB test;
   reading the description file of the IP distribution strategy after determining that the description file of the IP distribution strategy satisfies a preset reading condition;
   assembling the contents of the description file of the IP distribution strategy into an internal structural body, and sending an access request to a preset access adding strategy interface, wherein the access request includes the internal structural body; and
   when the access adding strategy interface receives the access request, updating the IP distribution strategy in a memory of the server by using the internal structural body so as to perform the AB test of IP distribution;
   and wherein the description file of the IP distribution strategy is a configuration file in a json format;
   and wherein the assembling the contents of the description file of the IP distribution strategy into an internal structural body comprises:
      reading the configuration file in the json format; and
      assigning different fields in the configuration file in the json format to preset various object attributes of the internal structural body.

6. The server of claim 5, wherein the program codes, when executed by the processor, cause the processor to further implement the following step:
   before the step of obtaining a pre-generated description file of an IP distribution strategy for an AB test, generating the description file of the IP distribution strategy for the AB test.

7. The server of claim 6, wherein the generating the description file of the IP distribution strategy for the AB test comprises:
   patterning a user map to obtain a geographical range of the AB test selected by an operating person;
   obtaining an IP segment address range corresponding to the geographical range according to the geographical range; and
   generating the description file of the IP distribution strategy for the AB test according to the IP segment address range.

8. The server of claim 5, wherein the program codes, when executed by the processor, cause the processor to further implement the following step: if a generation time of the description file of the IP distribution strategy is greater than a previous reading time of the description file of the IP distribution strategy, determining that the description file of the IP distribution strategy satisfies the preset reading condition.

* * * * *